United States Patent
Key et al.

(10) Patent No.: US 10,699,330 B2
(45) Date of Patent: Jun. 30, 2020

(54) SYSTEM AND APPARATUS FOR GEO-LOCATION BASED DATA ANALYSIS

(71) Applicant: Capital One Services, LLC, McLean, VA (US)

(72) Inventors: Kate Key, Effingham, IL (US); Austin Walters, Savoy, IL (US); Anh Truong, Champaign, IL (US); Vincent Pham, Champaign, IL (US); Jeremy Goodsitt, Champaign, IL (US); Kenneth Taylor, Champaign, IL (US); Fardin Abdi Taghi Abad, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 3 days.

(21) Appl. No.: 16/202,270

(22) Filed: Nov. 28, 2018

(65) Prior Publication Data
US 2020/0167854 A1   May 28, 2020

(51) Int. Cl.
| | |
|---|---|
| *G06Q 30/00* | (2012.01) |
| *G06Q 30/06* | (2012.01) |
| *H04W 4/33* | (2018.01) |
| *G01S 19/51* | (2010.01) |
| *H04W 4/021* | (2018.01) |
| *G06Q 30/02* | (2012.01) |
| *G06Q 20/38* | (2012.01) |

(52) U.S. Cl.
CPC ......... *G06Q 30/0639* (2013.01); *G01S 19/51* (2013.01); *H04W 4/021* (2013.01); *H04W 4/33* (2018.02); *G06Q 20/387* (2013.01); *G06Q 30/0207* (2013.01); *G06Q 30/0224* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 7,103,573 | B2 | 9/2006 | Mobed et al. |
| 7,975,292 | B2 | 7/2011 | Corella |
| 8,285,329 | B1 | 10/2012 | Zhu |
| 2004/0083170 | A1 | 4/2004 | Bam et al. |
| 2005/0138399 | A1 | 6/2005 | Cheston et al. |
| 2008/0103968 | A1 | 5/2008 | Bies et al. |
| 2008/0154724 | A1 | 6/2008 | Machlin et al. |
| 2009/0037275 | A1 | 2/2009 | Pollio |

(Continued)

OTHER PUBLICATIONS

Georgiou, Kyriakos, Anyplace: A Crowdsourced Indoor Information Service, Jun. 1, 2015, 2015 16th IEEE International Conference on Mobile Data Management, vol. 1, pp. 291-294 (Year: 2015).*

*Primary Examiner* — Michael Misiaszek
*Assistant Examiner* — Timothy J Kang
(74) *Attorney, Agent, or Firm* — Hunton Andrews Kurth LLP (57) ABSTRACT

A device and a backend server are described. The device can determine whether it has entered an indoor location, and once in the indoor location, the device can communicate with the server the name of the location. The device can determine the current location of the user in the indoor location, and based on the floorplan and the indoor location of an item, the device can direct the user to the item. The floorplan can be constructed based on data accumulated from various visitors of the indoor location.

18 Claims, 6 Drawing Sheets

(56) References Cited

U.S. PATENT DOCUMENTS

| | | |
|---|---|---|
| 2010/0250356 A1 | 9/2010 | Gillenson et al. |
| 2010/0288922 A1 | 11/2010 | Thomas et al. |
| 2010/0332356 A1 | 12/2010 | Spolar |
| 2011/0238476 A1* | 9/2011 | Carr ................... G06Q 30/00 705/14.25 |
| 2012/0239500 A1* | 9/2012 | Monahan ............. G01S 5/0036 705/14.58 |
| 2013/0024267 A1 | 1/2013 | Libenson et al. |
| 2013/0137464 A1 | 5/2013 | Kramer et al. |
| 2015/0169597 A1* | 6/2015 | Edge ................. G06F 16/9537 707/751 |
| 2015/0269624 A1* | 9/2015 | Cheng ............... G06Q 30/0267 705/14.58 |
| 2016/0005098 A1* | 1/2016 | Flynn ............... G06Q 30/0631 705/26.7 |
| 2016/0155107 A1* | 6/2016 | Haijji ................ G06Q 20/20 705/17 |
| 2016/0189276 A1* | 6/2016 | Batra ................ G06Q 30/0633 705/26.8 |
| 2017/0228810 A1* | 8/2017 | Shang ................ G06F 7/026 |

\* cited by examiner

SYSTEM AND APPARATUS FOR GEO-LOCATION BASED DATA ANALYSIS

BACKGROUND

Advancements in the Global Positioning System ("GPS") technology have revolutionized transportation and flow of commerce. However, GPS technology has its limits because it is dependent on receiving an unobstructed line of sight to four or more GPS satellites. Obstacles such as buildings block the relatively weak GPS signals. As a result, the GPS technology has not been accessible for indoor purposes.

SUMMARY

There are various obstacles in implementing an indoor GPS system. One problem with an indoor GPS navigation system is that, unlike roads and intersections which can be mapped and recorded by autonomous vehicles, indoor floorplans are largely unknown. Even if the indoor layout of a location is known, the layout can change quickly, e.g., the property owner might remodel the interior of the building. Therefore, it is an object of the present invention to overcome these technical difficulties with an indoor navigation system which relies on accurate floorplans for indoor spaces.

At the same time, with the expansion of Internet transactions, the demand for in-store products and services has been weak. To address this issue, retailers and other stores have encouraged customers to visit their locations because customers who visit stores are more likely to make in-store purchases as opposed to online. For example, some stores have offered coupons to encourage customers to visit their locations. Other stores have created loyalty programs which reward customers for purchasing a product from the store. However, these programs have failed to attract customers back to stores because these programs fail to dynamically address customers' needs and demands. Specifically, coupons target customers in general and it is difficult to customize a coupon to address the specific needs of a particular customer. Regarding the rewards programs, these days an average customer owns many rewards accounts such that it difficult for the customer to keep track of these accounts. As such, customers oftentimes forget about their rewards accounts and fail to use them at all. Therefore, it is beneficial to provide a system which can respond to customer needs and demands in a dynamic fashion.

To address these issues, a system, apparatus and method including a Device (device, smart device or gadget) and a backend server are described. The Device can determine whether it has entered an indoor location, and once in the indoor location, the Device can communicate with the server the name of the location. Based on the name of the location and a customer profile associated with the user, the server transmits a communication to the user which can include a product name, an indoor location of the product and a floorplan for the indoor location. The Device can determine the current location of the user in the indoor location, and based on the floorplan and the indoor location of the product, the Device can direct the user to the product identified in the communication. The server can obtain the floorplan from the operator of the indoor location. Alternatively, the server can create the floorplan based on an analysis of user purchases and user movements in the indoor location.

DETAILED DESCRIPTION

The Indoor Trigger Process

A user's Device can be configured to determine whether the device has entered an indoor location. The Device (or device or smart device) can be a smartphone, cell phone, a laptop, a desktop, a notebook, a tablet, a wearable device, etc.

In an example embodiment, the Device can determine whether the Device has entered an indoor space based on a reception deterioration of GPS signals. Many Devices including smartphones can receive GPS signals, and determine a user's location based on the received GPS signals. However, GPS signals become weaker and less accurate when a user enters an indoor space because the indoor space can be circumscribed by walls, roofs and other building structures. This deterioration of GPS signals can indicate to the Device that the user's Device has entered an indoor space. Specifically, an antenna of a Device can receive the GPS signals and a processor of the Device can determine the strength of the signals received. When the Device enters an indoor space, the GPS signals weaken. The processor of the Device can determine this change in the strength of the GPS signals. Therefore, the processor can trigger a signal which indicates that the Device has entered an indoor space.

In an example embodiment, the Device can determine whether the Device has entered an indoor space based on a Wi-Fi signal strengthening. With the advent of Internet technology, many indoor spaces are provided with at least one Wi-Fi network to facilitate Internet connectivity. When a Device approaches an indoor space, the Device can discover the signal associated with the Wi-Fi networks, and this signal rapidly strengthens as the user enters the indoor space. For example, an antenna of the Device can receive the Wi-Fi signals and a processor of the Device can detect that the signals are strengthening. Therefore, the processor of the Device can determine that the Device is in an indoor space by detecting a sudden increase in the strength of at least one Wi-Fi signal.

In an example embodiment, the Device can determine whether the Device has entered an indoor space based on the detection of an inaudible sonic signal or sound. The indoor space can include a sound generator which can generate specified sonic signals that are inaudible to humans but audible to Devices such as cellphones. The sounds can be at a frequency above the common range of human hearing, e.g., at least 18 KHz. Upon entering the indoor space, a microphone or speaker of the Device can detect the specified sonic signals, and this detection can enable the determination that the Device has entered an indoor space. This determination can be made by a processor of the Device. Similarly, a detection of a minimum threshold sonic signal strength, or a rapid increase in the strength of a sonic signal, can trigger a determination that the Device is in an indoor space.

In an example embodiment, the Device can determine whether the Device has entered an indoor space based on a change in the acoustic properties of the environment. For example, when a Device is entered an indoor space, the Device can detect acoustic echoing between the walls, floors and ceilings. The Device can determine the echoing by, e.g., generating a sonic signal of a specific frequency by a speaker of the Device and determining whether it can detect the sonic signal. The determination can be made by a processor of the Device. If the Device detects a level of echoing more than a threshold value, the Device can determine that the Device is in an indoor space.

In an example embodiment, the Device can determine whether the Device has entered an indoor space based on the detection of a magnetic field or an electric field. In general, a magnetic field or an electric field does not exist in an outdoor space, and thus, a change in either field can indicate that the Device is in an artificial environment, e.g., an indoor space. Many stores place an alarm gate at the entrance. When passing through these gates (or elsewhere in an indoor space), there can be a significant fluctuation in the magnetic field or the electric filed detected by the Device. An antenna of the Device can detect the magnetic or electric field and a processor can determine a change in the magnetic or electric field. The processor can trigger a signal which can indicate that the detected magnetic or electric field has fluctuated. Therefore, the Device can determine that the user has entered a store or has exited a store based on a processor determination of a change in detection of magnetic or electric field.

In an example embodiment, the user can notify the Device that the Device has entered an indoor space. For example, upon entry into a store, the user can press a button or an icon on the user's Device to indicate that the Device has entered an indoor space. As another example, the user can scan a bar code or some other sign to convey to the Device that the user and the Device are in an indoor space.

In an example embodiment, a Device can combine the methods described above for detecting whether a user has entered an indoor space. For example, a Device can consider a deterioration in GPS signal coupled with an increase in strength of a Wi-Fi signal to determine that a user has entered an indoor space. However, the Device might reach a different conclusion if only a deterioration in GPS signal is detected or an increase in strength of a Wi-Fi signal is detected.

While this disclosure listed a few methods for determining or detecting whether a Device has entered an indoor space, this list is not exhaustive and one of ordinary skill in the art recognizes that there can be other techniques for making this determination.

The detection of whether the Device has entered an indoor space can be active or passive. Active detection can be requested by the user of the Device. For example, the user can request the Device to determine whether the Device has entered an indoor space by evaluating the GPS signals or Wi-Fi signals received. Alternatively, the user can notify the Device that the Device has entered an indoor space. Passive detection can be done by the Device. Specifically, the Device can continuously or intermittently evaluate whether the Device has entered an indoor space. For example, a Device can continuously look for a GPS signal, Wi-Fi signal, magnetic field, electric field, etc. In some embodiments, the Device can intermittently look for these signals, e.g., once every few minutes.

In these disclosures, it is assumed that the user carries the Device with the user, and thus, the Device is at the same location as the user. However, in some embodiments, one does not need to make this assumption, and the location of the user can be different from the location of the Device.

Identifying the User and the Indoor Location

A sever in communication with the user's Device can identify the user of the Device. For example, the server can determine the name or account number of the user. The server can also ascertain a name (or an identifier) of the indoor location. For example, the server can determine the name of the business operating at the indoor location.

In some embodiments, the identification of the user and the indoor location can include two parts. In the first part, the user's Device can detect a signal or other indicator at the indoor location. In the second part, the user's Device communicates the user's identity and the detected signal (or indicator) to the server. In some embodiments, this communication is triggered by the Device's determination that the Device has entered an indoor space. The Device can convey the user's identity to the server by transmitting, for example, the user's name, an identification number associated with the user, an account number, or other piece of information facilitating the identification process by the server. The detected signal (or other indicator) at the indoor location and how it facilitates identification of the indoor location will be described below.

In an example embodiment, the identification of the location is facilitated by the last GPS signal received by the user's Device. For example, prior to or even after entering the location, the user's Device can receive and store a GPS signal indicating the GPS coordinates of the user's Device ("user's coordinates"). Using an application, the user's Device can communicate the user's coordinates to the server. This communication can optionally be triggered by the determination that the Device is in an indoor space. The server can look up the received GPS coordinates and determine a name or an identifier for the location. One or more databases of the server can include this information. For example, for a large retail shop which does not include any buildings or businesses adjacent to it, the last GPS signal received by the Device probably indicates that the Device is close to or at the door of the retail shop. Because there are no buildings next to the retailer, there would not be any confusion as to the name of the retail shop associated with the GPS signal. Therefore, the last GPS signal received by the Device can easily identify the retailer.

The process of matching the user's coordinates with the name of the location can include matching the user's coordinates with the known GPS coordinates of a device installed at the location. For example, a database of the server can include information such as the names of various businesses and the GPS coordinates of the point-of-sale ("POS") devices installed at these businesses. This information can be obtained, for example, by analyzing past purchases of customers at various locations. Specifically, one can analyze customer purchases and the GPS coordinates registered by their Devices at the time of each purchase to determine a database of GPS coordinates of POS devices installed at each location.

When the server receives the user's coordinates, the server can search for matching GPS coordinates, and based on that, the server can identify the business operating at the user's location. If an exact match was not found, the server can consider the closest match for the user's coordinates, e.g., the server can find matches within a tolerance range of the user's coordinates. For example, the server can look for a business that has the closest GPS coordinates to the user's coordinates. This can be helpful particularly when the last GPS signal received by the user's Device was recorded just outside of the business (and not exactly at the business). In the case of the retail shop which did not have any businesses adjacent to it, this method can easily identify the retail shop.

In another example embodiment, the identification of the location is facilitated by a Wi-Fi signal received by the user's Device. Many Wi-Fi networks can transmit a specific service set identifier ("SSID") (or another identifier, which can be a unique identifier). When a Device enters a store, the Device can discover the SSID of the Wi-Fi network that is broadcasted throughout the store. The Device can transmit the SSID of the network to the server. The server can include a database storing the location names or identifiers associated with SSIDs. In some embodiments, each SSID can be unique such that it is associated with only one location. Therefore, matching an SSID with an entry on the database uniquely identifies the name or identifier of the location.

In other embodiments, the SSIDs are not unique. In these embodiments, in addition to SSIDs and location names (or identifiers), the database can include GPS coordinates associated with each location name (or identifier) and SSID. The Device can transmit an SSID and the user's coordinates to the server. Using the user's coordinates, the server can narrow the number of SSIDs available and then match the received SSID with the name (or identifier) of a location included on the narrowed list. Using this method, there is a high likelihood that only one name (or identifier) of location can be found for the SSID received by the server.

In another example embodiment, the identification of the location is facilitated by the music played at the location. In these embodiments, each location can play a predetermined playlist and the database can include this playlist for each location. The user's Device can record a portion of the music track played at the location. In one embodiment, the user's Device can identify the music track, for example, by name, and transmit to the sever the name of the music track and the time when the Device made the recording. In another embodiment, the user's Device can transmit to the server the recorded portion of the music track and the time when the Device made the recording. The sever can look up all the music tracks played at the recording time, and by comparing the name of the recorded track to the names stored on the database, the server can identify the name of the location.

In an example embodiment, the identification of the location is facilitated by detection of an inaudible sonic signal emitted inside the location. For example, the inaudible sonic signal can encode a numeric identifier or a store identifier and this information can be received by the user's Device. A microphone or speaker of the Device can detect the inaudible sonic signal. This detection can occur, e.g., once the device receives a signal that the Device has entered an indoor location. Alternatively, the Device can listen for inaudible sonic signals all the time, or periodically. As yet another example, the Device can listen for inaudible sonic signal when a user activates a listening mode on an application of the Device. In response to detection of the inaudible sonic signal, a processor of the Device can determine the store identifier, the user's Device can transmit the store identifier to the server, and the server can ascertain the identity of the store based on the store identifier provided by the user's Device.

In some embodiments, the location transmitter can broadcast a variable sonic signal which has a variable numeric identifier. The numeric identifier can change based on the time of day or week the user visits the location. Variable numeric identifiers can be beneficial, for example, to signal a message to the server. For example, a variable numeric identifier can signal to the server that the store has a sale promotion going on and that the server can recommend a coupon to the user. As another example, a variable numeric identifier can prevent (unauthorized) users from receiving product recommendations without actually visiting the store. Because the numeric identifier changes over time, unless the user visits the store, the user would not be able to communicate to the server the correct numeric identifier, and hence the user would be prevented from receiving product recommendations.

In an example embodiment, the identification of the location is facilitated by a unique identification code of the user's Device. For example, when a user walks into an indoor location, the user's Device can transmit a request for connection to an access point. The access point can be a Wi-Fi, Bluetooth or cellular access point. A transmitter of the Device can transmit the request using a Wi-Fi, Bluetooth or cellular communication.

In some embodiments, the request can include the unique identification code of the user's Device. In other embodiments, upon connection to the access point, the user's Device transmits the unique identification code to the access point of the indoor location. Once the access point receives the unique identification code, it relays it to the server. In addition, the access point can transmit to the server an identifier for the location at which the access point is located. Using the user's unique identification code and the location identifier, the server can identify the user and the indoor location. Specifically, the server can include a database which has the unique identification code for all of its users and all of the location identifiers for the indoor locations. The server can look up the user's unique identification code and the location identifier to identify the user and the indoor location.

Indoor Location Detection

In some embodiments, the user's Device is configured to determine a user's specific location within the indoor location. For example, if a user is visiting a department store, the user's Device can determine which department in the store the user is visiting. The Device can determine the user's specific indoor location based on the Device's relative location compared to the location of one or more wireless access points (i.e., localization of the Device relative to the access points). RSSI, Fingerprinting, Angle of Arrival ("AoA") and Time of Flight ("ToF") are four exemplary techniques which can facilitate this determination. In these embodiments, the Device can be connected to one or more wireless access points at the indoor location and perform any of the named localization techniques to determine the relative location of the Device.

In the RSSI technique, the intensity of the received signal is measured from several different access points. Subsequently, a propagation model is used to determine the distance between the Device and each access point. Then, trilateration techniques can be used to calculate the estimated Device position relative to a known position of the access points. The Fingerprinting technique includes two steps. In the first step, at various locations in the building, a collection of Wi-Fi signals from the access points is sampled to create a position fingerprint. In the second step, which is the online positioning step, fingerprint information is collected around the position to be localized and compared with the sampled position fingerprint. In the AoA technique, multiple antennas are used to estimate an angle of arrival of the multipath signals received at the antenna arrays in the access points. Subsequently, the triangulation technique is used to calculate the location of the Device. In the ToF technique, a travel time for a signal to the Device and a return time from the Device is measured. Using these measurements, the distance between the Device and the access point is determined, and hence, a trilateration technique can be used to calculate the estimated position of the Device relative to the access points.

The User's Financial Account

In an example embodiment, the user can have an account with the service provider, and the account can hold a monetary balance. The balance can be denominated in, e.g., a national currency, a credit card point value or a cryptocurrency. For example, the account can be a checking account or a saving account held with a financial institution, and the user can maintain certain funds with the financial institution. As another example, the account can be a rewards account associated with a credit card company, and the balance of the account can reflect the rewards points that the user has accumulated over time. As yet another example, the account can be a cryptocurrency wallet in which the user maintains a number of cryptocurrency coins.

The details of the account can be maintained in a database of the server. For example, the database can include the balance for each checking or saving account maintained by the financial institution. As another example, the database can include the balance for each rewards account maintained by the credit card company. As yet another example embodiment, the database can be a hosted wallet including the private key for the user's cryptocurrencies.

The sever can receive a communication from the user's Device including the user's identity. Based on the user's identity, the server can search the database and determine an account balance for the user. In an example embodiment, the service provider is the owner of the server and has access to the users' accounts.

The User's Profile and Customer Profile

In an example embodiment of the present disclosure, a user can sign up for an online account with a service provider. The user can decide to open up the online account for a variety of reasons. For example, a user might decide to sign up for an online account because the user intends to review the user's information (e.g., account balance or purchase history) on the website of the service provider. As another example, the user might decide to sign up for an online account because the user desires to conduct online transactions on the service provider's website. The service provider can be an online retailer, a financial institution, a credit card company, a cryptocurrency exchange, etc. In some embodiments, the service provider can require the user to visit the service provider's website to sign up for the online account. The website can have a link, a button, a web page or other surfing indicia which can direct the user to enter the user's information. This information, for example, can include the user's name, email address, username and password. In some embodiments, the signing up process can take place using an application (or app) of the service provider. The user can visit the service provider's website and download the service provider's application. The user can run the service provider's application on the Device and open up the account using the application.

In an example embodiment, a user can create a user profile. The user profile can be created when the user is signing up for the account or after the user signs up for the account. The user profile can include various information about the user. For example, a user profile can include the date of birth of the user, gender, address, photo, etc. The user profile can also include the user's username or password. The user can express the user's preferences in the user profile. For example, a user can customize a user profile to indicate the products, locations, or activities that the user is interested in. The content of a user profile can change over time. For example, a user can update, modify or change the content of the user profile or add new content to the profile to reflect a change in the user's preferences or taste.

In an example embodiment, the service provider can create a customer profile for the user. The customer profile can be stored on a database of the service provider's server. The customer profile can exist regardless of whether the user creates a user profile. The customer profile can be available for the user to see or modify, but in some embodiments, the customer profile might not be available to the user. In some embodiments, the customer profile can be consolidated with the user profile so that there is only one profile associated with the user. The customer profile can include certain information about the user, and the service provider can dynamically add information to the customer profile. This information can include an interaction history of the user with the service provider, an analysis of the user's behavioral characteristics, a regression analysis and other analysis pertaining to the user's traits, habits or preferences. The customer profile can also include information from the user profile of each respective user. Using the information included in the customer profile, the server can make predictions about the user's preferences and make recommendations to the user.

For example, a service provider can be a credit card company. The credit card company has access to each user's prior purchases and can create a profile for the user's spending habits. The credit card company can also have access to the user's profile, which can include the user's age, gender, income, address, occupation, etc. Using the customer profile and the user profile, the server can make predictions about the user's future purchases, and thus, make recommendations or suggestions to the user.

The Goods and Services

In an example embodiment, an operator of a location can compile a list of products and services available at the location. In some embodiments, the operator can also prepare a floorplan of the indoor space. The operator can also associate an indoor area in the floorplan with each one of the products or services listed. The list of products and services can include other information as well. For example, the list can include a price for each item, a discount rate, a classification of the product, a profile of a typical customer who is interested in the product and the quantity of the product available for sale. The operator of the store can transmit all of this information to the server of the service provider.

Figure 1:
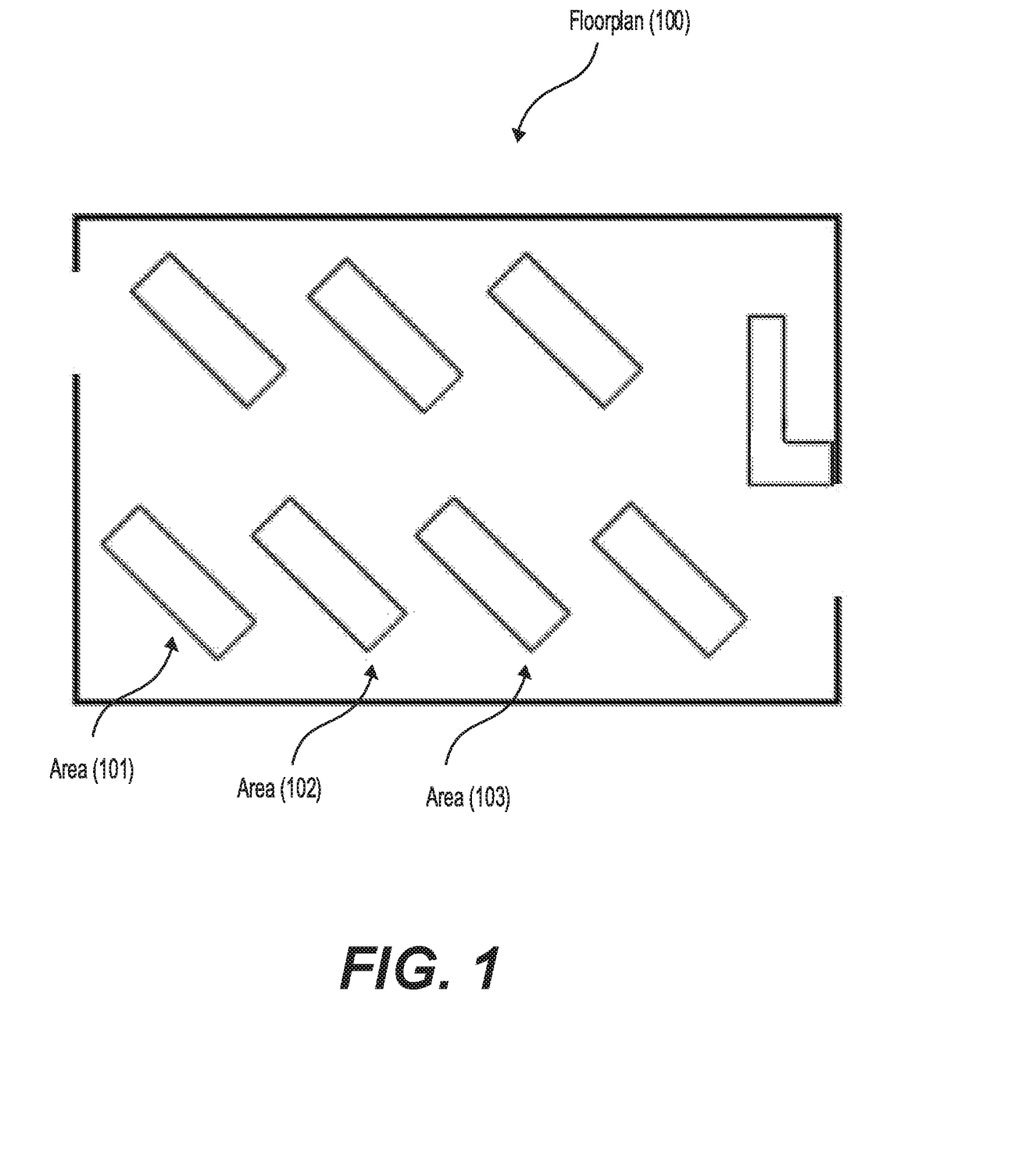
FIG. 1 shows an exemplary floorplan for a retail store.

FIG. 1 shows an exemplary floorplan 100 for a retail store. The retail store can compile a list of some of the products available for sale at this store. This list can include three products: dresses, blazers and hats. The floorplan 100 can include three areas designated as including these products. The list can indicate that the dresses are placed at area 101, the blazers are placed at area 102 and the hats are placed at area 103. The list can also indicate that typically girls are interested in the dresses, but boys are interested in the blazers and hats. The retail store can transmit the list and the floorplan to the server of the service provider.

Product Recommendation

In an example embodiment, the server can determine product recommendations for the user based on the user's account balance, the customer profile, the location and the goods and services available at the location. Specifically, the server can rank all the goods and services available at the location based on the user's preferences and habits indicated in the customer profile. The server can decide to make a recommendation if the highest ranked good or service falls within the user's budget as indicated by the user's account. If the highest ranked good or service falls outside of the user's budget, the server recommend the next highest ranked good or service that falls within the budget of the user. In some embodiment, the server can make a recommendation based on the profiles of typical customers for the goods and services. These profiles can be provided by the location operator.

For example, a user's customer profile can indicate that the user is a male in his 20s who is interested in hats and plays tennis. The information may have been compiled from a variety of sources, e.g., the user's prior purchases, the user's expressed preferences in the user's profile, etc. If the user visits the retail store of FIG. 1, the server can recommend a hat to the user. However, if the user visits a second retail store which carries tennis racquets, the server can recommend the tennis a racquet to the user. In some embodiment, the server can recommend a hat to the user even in the second store. This recommendation can be influenced by the user's prior purchase history which includes many hats.

In an example embodiment, product recommendations can be based on at least one of the following: past purchase history of the customer or other customers with similar profiles; purchase trends (which can be general trends, or trends for a specific product, location or customer profile); frequently of visits to specialty stores (e.g., makeup, sporting goods, etc.); information that is volunteered by the customer; information the customer volunteered to the customer's loyalty program; and the customer's banking information (e.g., transaction history).

The Application

A user's Device can include an application. The application can determine whether the user is in an indoor space, and this determination can trigger a communication to the server of the service provider. The communication can include an indicator or identifier based on which the server can determine the name of the location from which the communication was received. The communication can also include an identifier for the user, and the server can identify the user based on this identifier.

In an example embodiment, upon determining the name of the location, the server is configured to determine the products or services available at the location. This determination can be based on a list provided by the location operator. The server is also configured to determine the available balance for the account of the user. Based on this balance, the customer profile for the user and the list of products or services available, the server can transmit a communication to the application. This communication can include for example, a product or service that is the most relevant to the user based on the user's customer profile. The communication can also include an area identifier for the product or service and possibly a floorplan of the location.

The application is configured to display a notification to user. This notification can be based on the communication that the application received from the server. In some embodiments, the notification can indicate that a product or service is available for the user, and that the user has enough funds or points in the user's account to purchase the product or service. The notification can also indicate where the product or service is located in the location.

Figure 2:
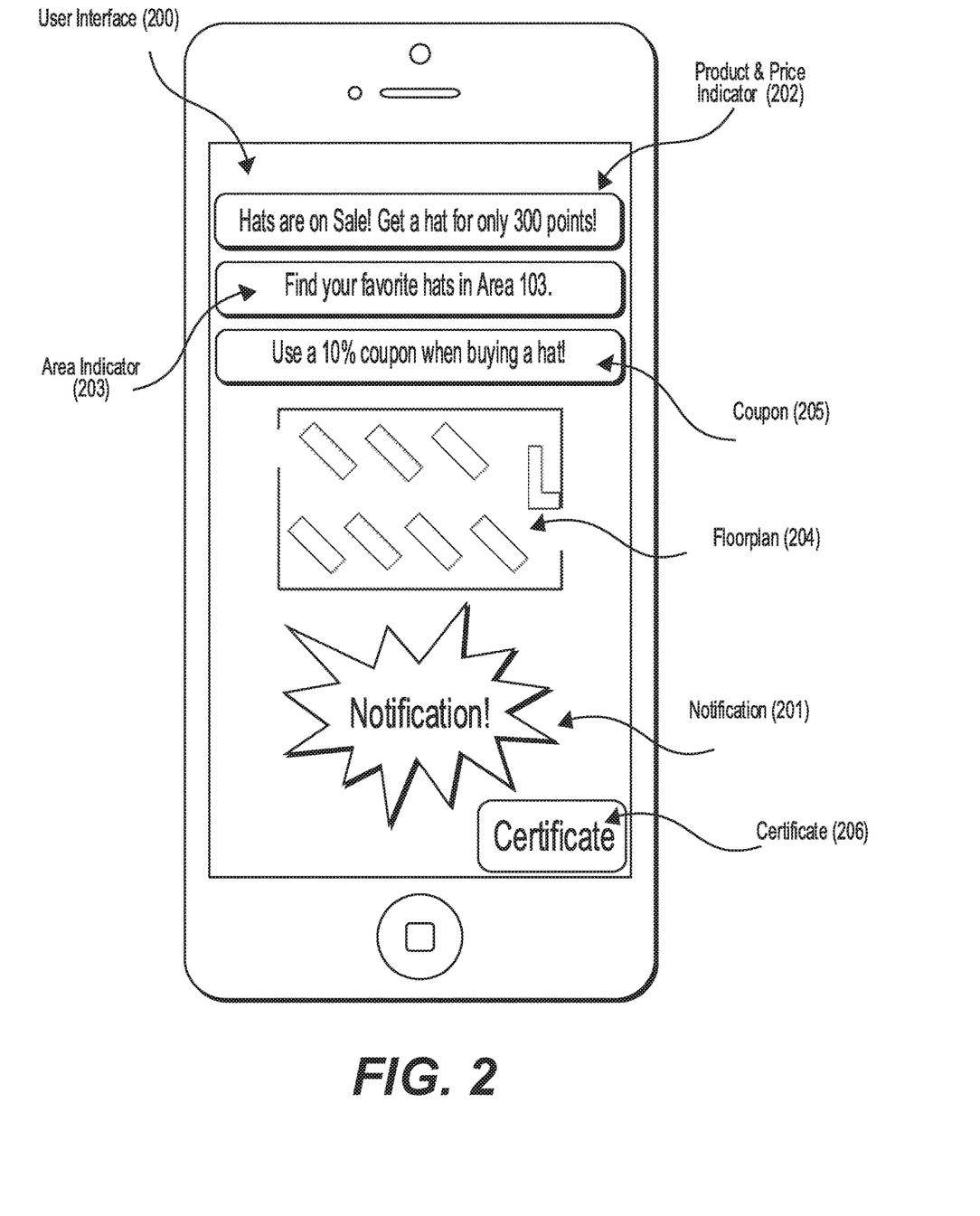
FIG. 2 is a user interface of an application according to an example embodiment.

FIG. 2 is a user interface 200 of an application according to an example embodiment. The user interface 200 is displaying a notification 201, which can include a product and price indicator 202, an area indicator 203 and a floorplan 204. In this example embodiment, the user is visiting a retail store which sells dresses, blazers and hats. The service provider is a credit card company and the user maintains a rewards account with the credit card company. The server determined that hats are the products that are the most relevant to the user based on the user's customer profile and the points balance of the user's rewards account, i.e., the user has enough points to purchase the hat. Thus, the server transmitted a notification to the user's Device. The Device displayed the notification 201, which displays "Hats are on Sale! Get a hat for only 300 points!" as the product and price indicator 202. The notification 201 also displays "Find your favorite hats in Area 103" as the area indicator 203. The notification 201 further displays the floorplan 204 for the retail store.

In some embodiments, the application can provide directions for the user to find the product or service included in the notification. The user can request the application to direct the user to the indoor area where the product or service is placed. The application can use any of the following techniques to determine the current indoor location of the user: RSSI, Fingerprinting, AoA and ToF. Using the floorplan of the indoor space, the indoor area indicator for the product and the current indoor location of the user, the application can determine the fastest route to that indoor location.

Figure 3:
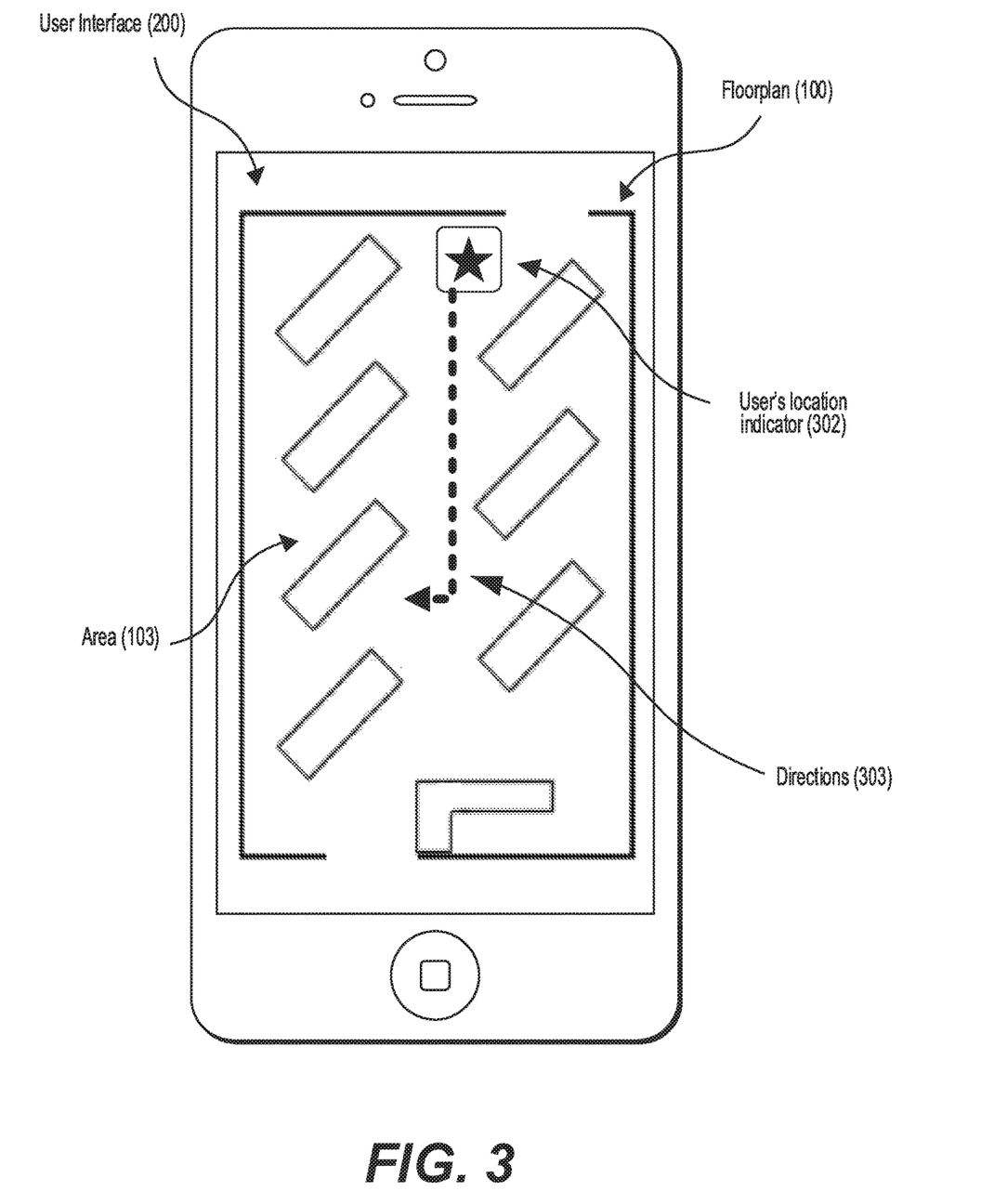
FIG. 3 shows example directions provided to the user of the application.

In FIG. 2, the user can tap on the floorplan 204, and the application can direct the user to the area where hats are placed. FIG. 3 shows example directions provided to the user of the application. In this embodiment, the user interface 200 displays the floorplan 301 provided by the retail store. The user's location indicator 302 displays the user's current location in the indoor space. This location can be determined by any of the above described techniques. The hats, i.e., the recommended products, are located in area 103 of the floorplan 301. The application can display directions 303 on the user interface 200 of the application. These directions can be static, e.g., the directions can be a drawing on the floorplan or a list of written steps which the user can read and follow. These directions can be dynamic, e.g., the user interface can show the user's movements on the floorplan 301 or direct the user (e.g., tell the user) to walk in a specific direction.

In an example embodiment, an indoor location operator can issue a coupon for a specific product or service. The operator can communicate this coupon to the server of the service provider. When the server receives a communication that a user is in the indoor location, the service provider can transmit the coupon with a notification. Specifically, if the server determines that the product or service (for which there is coupon) is the highest ranked product or service that can be afforded by the user, the server transmits a communication including the product or service and the coupon. For example, in FIG. 2, coupon 205 states "Use a 10% coupon when buying a hat!" This coupon relates to the products, i.e., hats, that the server recommended to the user based on the customer profile of the user. Because the selection of the product is based on the user's preferences, the coupon will highly likely result in a sale for the location operator. Therefore, this can be a very effective advertising method.

Figure 4:
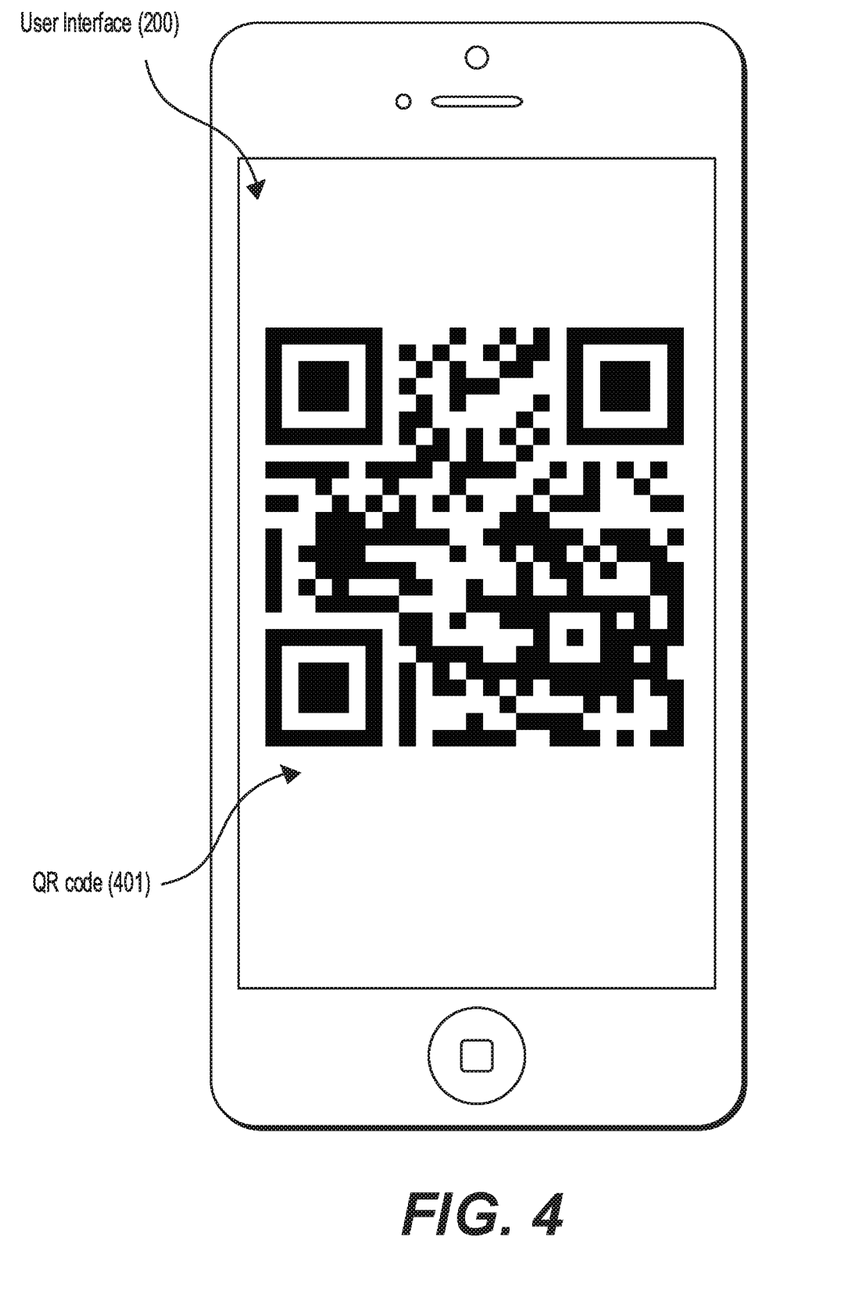
FIG. 4 displays an example redeemable certificate displayed on the user interface of the application.

In an example embodiment, the user can ask the application to facilitate a payment to the location operator for a product or service. The payment can be facilitated, for example, if the application can display a certificate which can be redeemed at the indoor location. As such, in an example embodiment, when the user receives the notification, the user can select an option for receiving a certificate redeemable at the indoor location. In FIG. 2, the user can tap on the certificate button 206 to receive a certificate redeemable at the retail store. When the user taps on this button, the application can display another page to the user. On the certificate redeem page, the user can specify whether the user intends to use any coupons in connection with the certificate. The application can then submit a request to the server. Upon receiving this request, the server can confirm whether the user's account holds sufficient funds to honor the user's request. In response, the server can transmit a communication to the user. The application is configured to receive this communication and display it on the user interface of the application. For example, the application can display the certificate as a barcode, which can be scanned and redeemed at a cash register of the indoor location. FIG. 4 displays an example redeemable certificate displayed on the user interface 200 of the application. In this example embodiment, the redeemable certificate is displayed as a quick response code 401. Although a quick response code is depicted as the redeemable certificate in this example embodiment, one of ordinary skill in the art recognizes there can be other means to display a redeemable certificate. For example, any optical, machine-readable, representation of data can be used as a redeemable certificate. Bar codes are an example of such representations. Additionally, text strings can also be used as redeemable certificates.

In an example embodiment, the application can have a search function which can enable a user to search for the products or services available at the location. This search function can be based on the list of products or services communicated to the server by the location operator. The server can automatically transmit the list to the application. Other means of transmitting the list to the application is also conceivable. For example, the list can be transmitted to the user if the user activates the search function. The list can include various products or services for sale, their respective prices and other information. The application can include a search tab and upon tapping on the search tab, the application can display a search bar to the user. The user can search for a product or service by typing keywords in the search bar. The search function can return a list of products or services that match the search criteria. Each item on the returned list can include a price for the item and a location indicator, which indicates where the product is located. In some embodiments, the user can tap on an item on the returned list, and the application is configured to direct the user to the area of the indoor location which has the selected product. The application can provide a dynamic or static direction to the user.

In an example embodiment, the application is configured to store a log of a user's movements. For example, the application can store the GPS coordinates of a Device for a period of time. The user can make a purchase using the account the user has with the service provider. After making the purchase, the service provider can send a communication to the application requesting the user's GPS coordinates at the time of the purchase. The application can be configured to transmit the user's GPS coordinates at the time of the purchase. By gathering the data relating to the user's GPS coordinates and matching them with the names of the locations at which the user made the purchases, the service provider can build a database including the names and GPS coordinates of various indoor location operators. If the GPS coordinates of the user at the time of the purchase is not available, e.g., the indoor location does not receive GPS signals, the application can transmit the last know GPS coordinates of the user at the time of the purchase.

In an example embodiment, the service provider can construct a floorplan for an indoor location using the data provided by the application. Specifically, the application can store a log of a user's movements inside an indoor location. The log of the user's movements can include the relative locations of the user at the time of the visit compared to the location of one or more wireless access points. The server can request this information from the application and the application can transmit this information to the server. The server can receive this information from the applications of multiple users and aggregate this data. Using the aggregated data, the server can construct a floorplan of the indoor location.

Additionally, the indoor location operator can provide the service provider with a list of products and services purchased by each user when the user visited the indoor location. The service provider can also request the movement log of each one of the users when they visited the indoor location. Using the list of products and services purchased by each user and their respective movement log, the service provider can determine the location of the products offered by the store.

Figure 5:
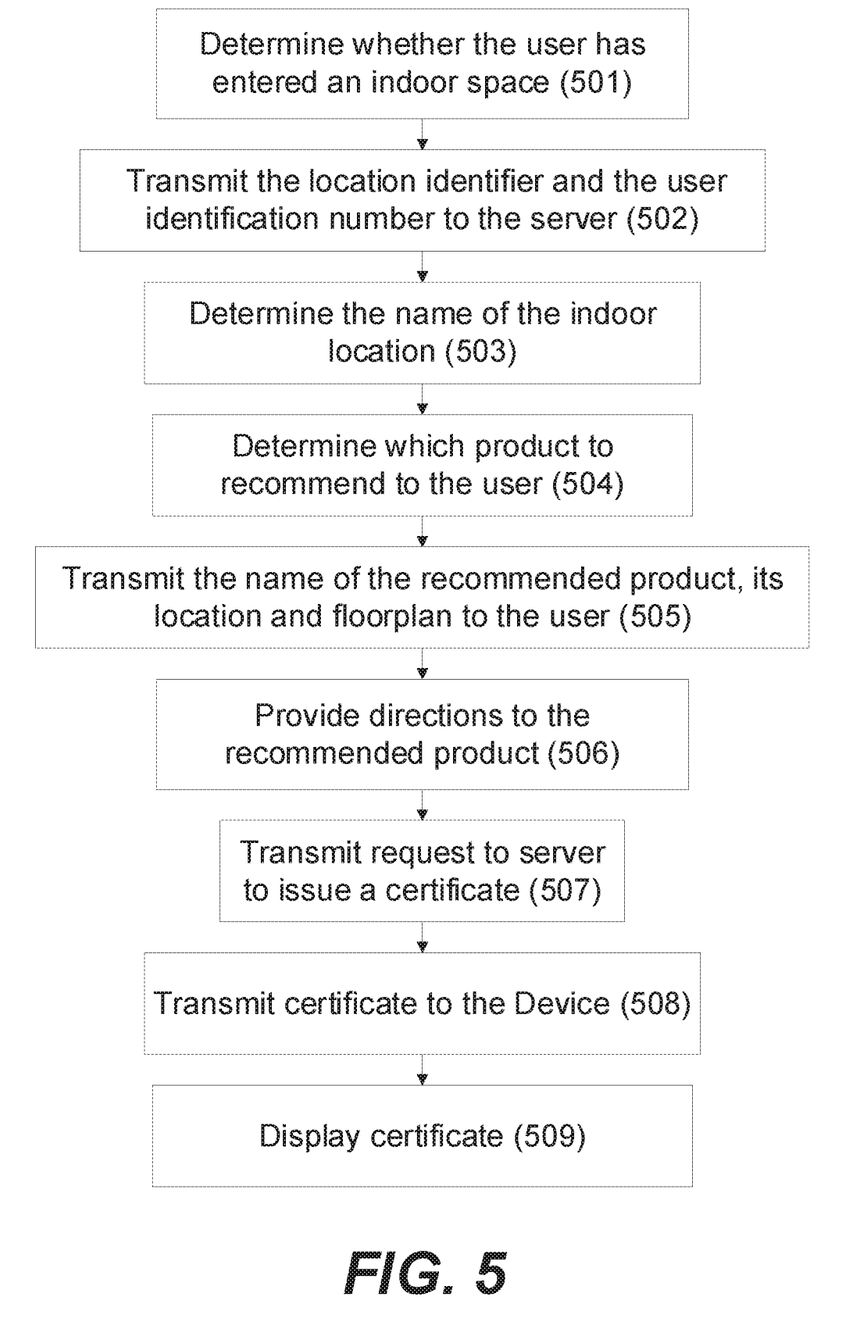
FIG. 5 shows an example process flow for providing indoor directions to a user.

FIG. 5 shows an example process flow for providing indoor directions to a user. In this example embodiment, in step 501, a user enters an indoor space and the user's Device determines that the user has entered the indoor space. This determination can be made in response to detecting a strengthening Wi-Fi signal by the Device. The Device detects the SSID associated with the Wi-Fi signal, and in step 502, the Device transmits this SSID and the user's identification number to the server. In step 503, based on the SSID provided by the Device, the server determines the name of the indoor location from which the user transmitted the communication. In step 504, the server determines which products are available at the indoor location and based on the user's customer profile and account balance, the server determines which product to recommend to the user. In step 505, the server transmits the recommended product, an indoor location for the product, and a floorplan for the indoor location. In step 506, the user requests the application to provide directions for the user to the recommended product, and the application provides dynamic directions to the user. In step 507, the user requests the application to issue a certificate for the recommended product, and the application transmits this request to the server. In step 508, the server issues the certificate and transmits it to the Device. In step 509, the Device displays the certificate as a barcode.

Technical Implementation of the Sever

Figure 6:
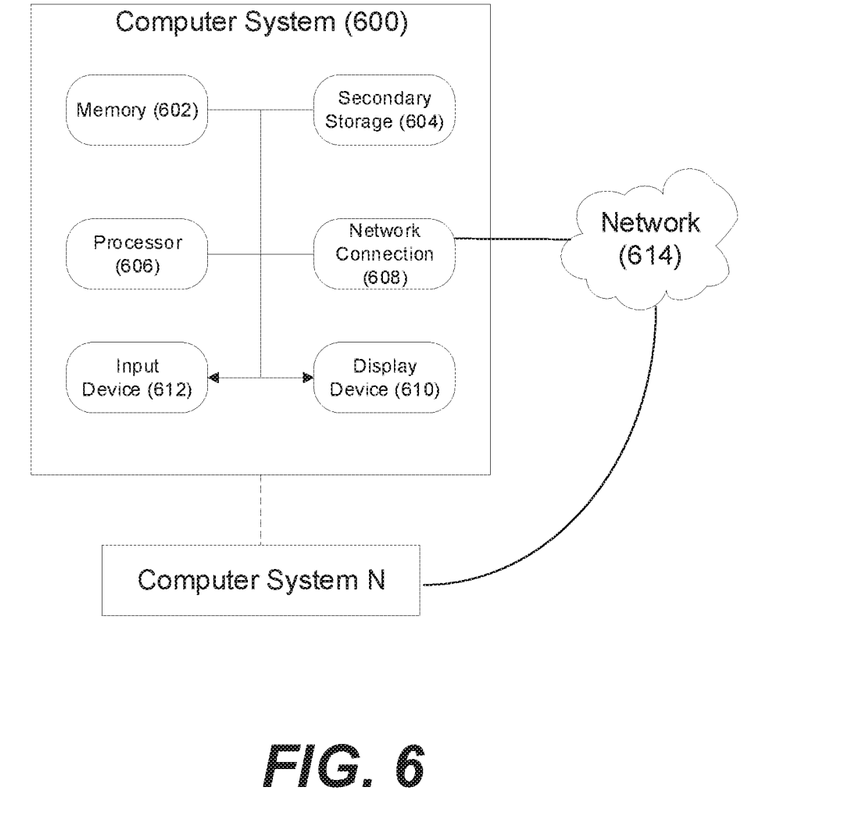
FIG. 6 illustrates exemplary hardware components a server or a Device.

FIG. 6 illustrates exemplary hardware components a server or a Device. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquires, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method comprising:
   receiving, at a server from a client device, a location identification number, a recording, and a user identification number;
   identifying, at the server, a name for the recording;
   determining, at the server, an identity of an indoor location based on the location identification number and the name of the recording;
   receiving, at the server from the client device, a movement log, wherein the movement log indicates location coordinates of the client device at the indoor location relative to a wireless access point; and
   transmitting a communication from the server to the client device including the identity of the indoor location, a floorplan, a recommended product and an indoor location identifier for the recommended product, wherein:
   the server constructs the floorplan by aggregating a plurality of movement logs received from a plurality of client devices;
   the server determines the indoor location identifier based on a plurality of lists of purchases associated with the movement logs; and
   the indoor location identifier is configured to be displayed in association with the floorplan in a user interface of the client device.

2. The method of claim 1, wherein the communication includes an indoor direction to the recommended product.

3. The method of claim 1, wherein the indoor location identifier of the recommended product identifies an area on the floorplan.

4. The method of claim 1, wherein the location identification number is GPS coordinates of the client device prior to entry into the indoor location.

5. The method of claim 4, wherein the server determines the identity of the indoor location based on the GPS coordinates of the client device.

6. The method of claim 1, wherein the location identification number is an SSID of a Wi-Fi network at the indoor location.

7. The method of claim 6, wherein the server determines the identity of the indoor location based on the SSID of the Wi-Fi network.

8. The method of claim 1, further comprising:
receiving a request from the client device to issue a certificate redeemable at the indoor location; and
transmitting, from the server to the client device, a second communication including the certificate, wherein the certificate is configured to be displayed in the user interface of the client device.

9. The method of claim 8, wherein the communication includes an account balance associated with the user identification number and the account balance indicates a monetary value configured to be redeemed at a cash register of the indoor location.

10. The method of claim 9, wherein the communication includes a price for the recommended product and the price of the recommended product is less than the balance of the account.

11. The method of claim 10, wherein the certificate has a value equal to the price of the recommended product.

12. The method of claim 8, wherein the certificate includes a unique identification number which can be redeemed at a cash register of the indoor location.

13. The method of claim 12, wherein the unique identification number is configured to be displayed in the user interface of the client device as a matrix bar code.

14. The method of claim 1, wherein the recommended product is determined based on a user profile.

15. The method of claim 14, wherein the user profile includes an age and a gender.

16. The method of claim 14, wherein the user profile includes an interaction history of a user with the indoor location.

17. The method of claim 14, wherein the user profile includes, an analysis of a user's behavioral characteristics.

18. The method of claim 14, wherein the user profile includes, a regression analysis pertaining to a user's traits, habits or preferences.

* * * * *